(12) United States Patent
Delorenzis et al.

(10) Patent No.: US 10,843,520 B2
(45) Date of Patent: Nov. 24, 2020

(54) HEAVY-DUTY VEHICLE AXLE/SUSPENSION SYSTEM WITH OPTIMIZED DAMPING

(71) Applicant: Hendrickson USA, L.L.C., Itasca, IL (US)

(72) Inventors: Damon Delorenzis, Plainfield, IL (US); Jeff R. Zawacki, Channahon, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 100 days.

(21) Appl. No.: 16/400,126

(22) Filed: May 1, 2019

(65) Prior Publication Data

US 2019/0337346 A1 Nov. 7, 2019

Related U.S. Application Data

(60) Provisional application No. 62/667,004, filed on May 4, 2018.

(51) Int. Cl.
*B60G 9/02* (2006.01)
*B60G 11/27* (2006.01)
*B60G 13/00* (2006.01)

(52) U.S. Cl.
CPC .............. *B60G 9/02* (2013.01); *B60G 11/27* (2013.01); *B60G 13/003* (2013.01); *B60G 13/005* (2013.01); *B60G 2200/31* (2013.01); *B60G 2202/152* (2013.01); *B60G 2204/128* (2013.01)

(58) Field of Classification Search
None
See application file for complete search history.

(56) References Cited

U.S. PATENT DOCUMENTS

| | | | | |
|---|---|---|---|---|
| 5,197,755 A | * | 3/1993 | Quick | ................ B60G 3/20 267/254 |
| 5,470,096 A | | 11/1995 | Baxter | |
| 5,649,719 A | | 7/1997 | Wallace et al. | |
| 6,032,752 A | * | 3/2000 | Karpik | ................ B60G 13/005 180/193 |

(Continued)

FOREIGN PATENT DOCUMENTS

EP    3360707    8/2018

*Primary Examiner* — Drew J Brown
(74) *Attorney, Agent, or Firm* — Dureska & Moore, LLC; David P. Dureska; Brent L. Moore

(57) ABSTRACT

An axle/suspension system for a heavy-duty vehicle includes a suspension assembly, an axle, and a damping means. The suspension assembly is operatively connected to the heavy-duty vehicle. The axle is operatively connected to the suspension assembly. The damping means is operatively connected to and extends between the suspension assembly and the heavy-duty vehicle. The axle/suspension system has a motion ratio of between about 1.4 to about 1.7. A method for optimizing damping of an axle/suspension system of a heavy-duty vehicle includes the steps of: calculating a curve representing a damping energy relating to load on a damping air spring; calculating a curve representing a damping energy relating to air flow velocity through at least one opening of the air spring; calculating an optimized motion ratio by determining an intersection of the curves; altering the geometry of the axle/suspension system to provide the axle/suspension system with the optimized motion ratio.

20 Claims, 16 Drawing Sheets

(56) References Cited

U.S. PATENT DOCUMENTS

| | | | |
|---|---|---|---|
| 6,412,789 B1 | 7/2002 | Pierce et al. | |
| 10,752,075 B1* | 8/2020 | Shukla | B60G 17/01941 |
| 2006/0244233 A1* | 11/2006 | Anderson | B60G 3/202 |
| | | | 280/124.128 |
| 2011/0127733 A1* | 6/2011 | Conradie | B60G 3/145 |
| | | | 280/5.514 |
| 2012/0031688 A1* | 2/2012 | Safranski | B60G 7/006 |
| | | | 180/54.1 |
| 2014/0260233 A1* | 9/2014 | Giovanardi | F15B 13/0444 |
| | | | 60/431 |
| 2016/0159180 A1* | 6/2016 | Palatov | B60G 13/18 |
| | | | 280/5.507 |
| 2017/0151848 A1 | 6/2017 | Delorenzis | |

* cited by examiner

HEAVY-DUTY VEHICLE AXLE/SUSPENSION SYSTEM WITH OPTIMIZED DAMPING

CROSS-REFERENCE TO RELATED APPLICATION

This application claims the benefit of U.S. Provisional Application No. 62/667,004, filed May 4, 2018.

BACKGROUND OF THE INVENTION

Field of the Invention

The present invention relates generally to the art of axle/suspension systems for heavy-duty vehicles. In particular, the present invention is directed to axle/suspension systems for heavy-duty vehicles utilizing damping air springs. More particularly, the present invention is directed to an axle/suspension system for a heavy-duty vehicle that includes a suspension motion ratio calculated to provide optimal damping performance for a given damping air spring in order to improve performance, ride quality, and durability of the axle/suspension system.

Background Art

The use of air-ride trailing- and leading-arm rigid beam-type axle/suspension systems has been very popular in the heavy-duty vehicle industry for many years. For the purposes of clarity and convenience, reference is made to a heavy-duty vehicle with the understanding that such reference includes trucks, tractor-trailers and semi-trailers, trailers, and the like. Although such axle/suspension systems can be found in widely varying structural forms, in general their structure is similar in that each system typically includes a pair of suspension assemblies. The suspension assemblies are typically connected directly to a primary frame of the heavy-duty vehicle or to a subframe supported by the primary frame. For those heavy-duty vehicles that support a subframe, the subframe can be non-movable or movable, the latter being commonly referred to as a slider box, slider subframe, slider undercarriage, secondary slider frame, or bogey.

Each suspension assembly of the axle/suspension system includes a longitudinally extending elongated beam. Each beam typically is located adjacent to and below a respective one of a pair of spaced-apart longitudinally extending main members and one or more cross members of the heavy-duty vehicle. For the purpose of convenience and clarity, reference herein will be made to main members, with the understanding that such reference is by way of example and includes main members of primary frames, movable subframes, and non-movable subframes. More specifically, each beam is pivotally connected at one of its ends to a hanger which in turn is attached to and depends from a respective one of the main members of the heavy-duty vehicle. The beam may extend rearwardly or frontwardly from the pivotal connection relative to the front of the heavy-duty vehicle, thus defining what are typically referred to as trailing- or leading-arm axle/suspension systems, respectively. An axle extends transversely between, and typically is connected by some means, to the beams of the pair of suspension assemblies at a selected location from about the mid-point of each beam to the end of the beam opposite the pivotal connection end. An air spring, or its equivalent, is typically connected to the beam end opposite the pivotal connection end and to a respective one of the main members. A height control valve is mounted on the main member or other support structure and is operatively connected to the beam and the air spring in order to maintain the ride height of the heavy-duty vehicle. A brake system may also be mounted on the axle/suspension system, as is known.

The axle/suspension systems of the heavy-duty vehicle act to cushion the ride, damp vibrations, and stabilize the heavy-duty vehicle. More particularly, as the heavy-duty vehicle is traveling over the road, the wheels of the heavy-duty vehicle encounter road conditions that impart various forces, loads, and/or stresses, collectively referred to herein as forces, to the respective axle on which the wheels are mounted, and in turn, to the suspension assemblies that are connected to and support the axle. These forces include vertical forces caused by vertical movement of the wheels as they encounter certain road conditions, fore-aft forces caused by acceleration and deceleration of the heavy-duty vehicle, and lateral and torsional forces associated with transverse heavy-duty vehicle movement, such as turning and lane-change maneuvers.

In order to minimize the detrimental effect of these forces on the heavy-duty vehicle as it is operating, the axle/suspension system is designed to react and/or absorb at least some of them. In particular, the axle/suspension systems have differing structural requirements to address these disparate forces. More particularly, it is desirable for an axle/suspension system to be fairly stiff in order to minimize the amount of sway experienced by the heavy-duty vehicle and thus provide what is known in the art as roll stability. However, it is also desirable for an axle/suspension system to be relatively flexible to assist in cushioning the heavy-duty vehicle from vertical impacts, and to provide compliance so that the components of the axle/suspension system resist failure, thereby increasing durability of the axle/suspension system. It is also desirable to damp the vibrations or oscillations that result from such forces to provide a more comfortable ride and reduce irregular wear of the tires.

A key component of the axle/suspension system is the air springs, which cushion the ride of the heavy-duty vehicle from vertical impacts. Air springs utilized in heavy-duty vehicle air-ride axle/suspension systems typically can be characterized as either non-damping or damping. A non-damping air spring typically includes three main components: a flexible bellows, a piston, and a bellows top plate. The bellows is formed from rubber or other flexible material, and is operatively mounted on top of the piston. The piston is typically formed from steel, aluminum, fiber reinforced plastics, or other sufficiently rigid material and is mounted on the beam of each suspension assembly in a known manner. The air spring bellows is filled with a volume of pressurized air provided to the air spring via an air reservoir attached to the heavy-duty vehicle, such as an air tank. The volume of pressurized air, or "air volume", that is contained within the air spring is a major factor in determining the spring rate, or stiffness, of the air spring. The larger the air volume of the air spring, the lower the spring rate of the air spring. A lower spring rate is generally more desirable during normal heavy-duty vehicle operation because it provides a softer ride.

Prior art non-damping air springs, while providing cushioning to the vehicle cargo and occupant(s) during operation of the heavy-duty vehicle, provide little or no damping. In axle/suspension systems that utilize non-damping air springs, damping characteristics are instead typically provided via one or more hydraulic shock absorbers, which are generally optimized for operation at a rated load of the heavy-duty vehicle, as is known. Each one of the shock absorbers is mounted on and extends between the beam of a respective one of the suspension assemblies of the axle/suspension system and a respective one of the main members of the vehicle.

Non-damping air springs of the prior art have limitations due to the reliance on shock absorbers for damping. Although shock absorbers provide damping to the axle/suspension system, they add complexity and weight to the axle/suspension system, as well as presenting concerns of durability over the life of the vehicle. For example, the damping characteristics of the shock absorber tend to degrade over time, causing the suspension to become underdamped at a rated load after some accumulated mileage. The deterioration of shock absorber performance causes the need for eventual replacement of the shock absorber, thus creating additional costs. Furthermore, such shock absorbers are tuned to match the stiffness of the axle/suspension system at a rated load. This causes the suspension system to be overdamped when the axle/suspension system is lightly loaded, decreasing ride quality and durability of the axle/suspension system during operation.

Damping air springs have been incorporated into axle/suspension systems to overcome some of the limitations imposed by the use of non-damping air springs with hydraulic shock absorbers. A damping air spring typically includes three main components: a flexible bellows, a piston, and a bellows top plate. The bellows is formed from rubber or other flexible material, and is operatively mounted on top of the piston. The piston is typically formed from steel, aluminum, fiber reinforced plastics, or other sufficiently rigid material, and is mounted on the top plate of the beam of each suspension assembly of the axle/suspension system by fasteners. One or more openings are typically formed between the piston and the bellows to allow restricted air flow back and forth between the bellows and the piston during jounce events. These prior art axle/suspension systems with damping air springs provide some amount of damping so that the shock absorber can be removed. However, the prior art axle/suspension system with damping air springs is not optimized to provide the most damping energy possible. In particular, the design of prior art axle/suspension systems with damping air springs generally does not account for matching the motion ratio of the axle/suspension system with the damping air springs being utilized. As a result, prior art axle/suspension systems potentially do not provide the axle/suspension system with optimal damping performance, ride quality, or durability.

The heavy-duty vehicle axle/suspension system with optimized damping, according to the present invention, overcomes the limitations of the prior art axle/suspension systems utilizing non-damping and damping air springs by taking into account the motion ratio of the axle/suspension system, allowing the motion ratio of the axle/suspension system to be modified, and, thus, providing optimized damping for a given damping air spring. This improves performance, ride characteristics, and durability of the axle/suspension system during operation of the heavy-duty vehicle.

SUMMARY OF THE INVENTION

Objectives of the present invention include providing an axle/suspension system with optimized damping that takes into account the motion ratio of the axle/suspension system.

A further objective of the present invention is to provide an axle/suspension system that allows the motion ratio to be modified for a given damping air spring to improve performance, ride characteristics, and durability of the axle/suspension system.

These objectives and advantages are obtained by the axle/suspension system for a heavy-duty vehicle including a suspension assembly operatively connected to the heavy-duty vehicle; an axle operatively connected to the suspension assembly; and a damping means operatively connected to and extending between the suspension assembly and the heavy-duty vehicle, the axle/suspension system having a motion ratio of between about 1.4 to about 1.7.

These objectives and advantages are also obtained by the method for optimizing the damping of an axle/suspension system of a heavy-duty vehicle of the present invention, which includes calculating a first curve representing a first damping energy relating to a load on a damping air spring, calculating a second curve representing a second damping energy relating to air flow velocity through at least one opening of the damping air spring, calculating an optimized motion ratio by determining an intersection of the first curve and the second curve, and altering a geometry of a component of the axle/suspension system to provide the axle/suspension system with the optimized ratio.

BRIEF DESCRIPTION OF THE SEVERAL VIEWS OF THE DRAWINGS

The preferred embodiment of the present invention, illustrative of the best mode in which applicant has contemplated applying the principles, is set forth in the following description, is shown in the drawings, and is particularly and distinctly pointed out and set forth in the appended claims.

Similar reference characters refer to similar parts throughout.

DESCRIPTION OF THE PREFERRED EMBODIMENT

Figure 1:
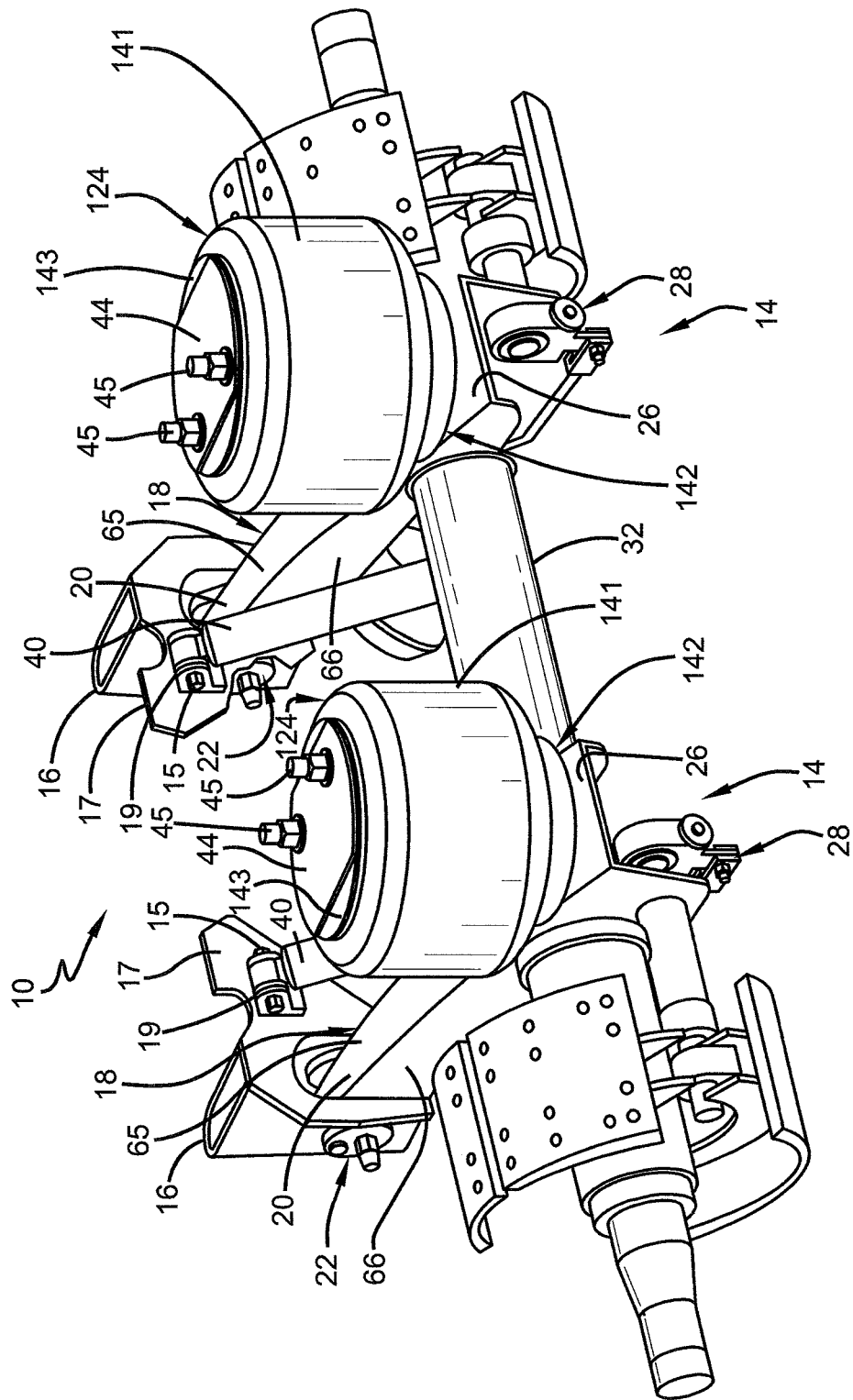
FIG. 1 is a rear driver-side perspective view of a prior art axle/suspension system with a pair of non-damping air springs and hydraulic shock absorbers, showing a portion of the curb-side hanger of the axle/suspension system cut away.

In order to better understand the environment in which the heavy duty vehicle axle/suspension system with optimized damping of the present invention is utilized, a prior art beam-type air-ride axle/suspension system 10 incorporating a prior art non-damping air spring 124 is shown in FIG. 1 and described in detail below.

Axle/suspension system 10 typically includes a pair of suspension assemblies 14, each mounted on a respective longitudinally-extending spaced-apart main member (not shown) of a heavy-duty vehicle (not shown). Because suspension assemblies 14 are generally mirror images of one another, for the purpose of conciseness, only a single suspension assembly will be described below.

Suspension assembly 14 includes a beam 18 pivotally connected to a hanger 16. More specifically, beam 18 includes a front end 20 having a bushing assembly 22 to facilitate pivotal connection of the beam to hanger 16, as is known. Beam 18 is formed with a generally upside-down integrally formed U-shape having a pair of sidewalls 66 and a top plate 65, with the open portion of the beam facing generally downwardly. A bottom plate (not shown) of beam 18 extends between, and is attached to, the lowermost ends of sidewalls 66 by any suitable means, such as welding. Beam 18 also includes a rear end 26, which is welded or otherwise rigidly attached to a transversely extending axle 32. For the sake of relative completeness, a brake system 28 is shown mounted on prior art suspension assembly 14.

Suspension assembly 14 also includes non-damping air spring 124 and a shock absorber 40. Non-damping air spring 124 is mounted on and extends between rear end 26 of beam 18 and the main member of the heavy-duty vehicle. Non-damping air spring 124 includes a bellows 141 and a piston 142. The top portion of bellows 141 is sealingly engaged with a bellows top plate 143. An air spring mounting plate 44 (FIG. 1) is mounted on top plate 143 by a pair of fasteners 45, which are also used to mount the top portion of non-damping air spring 124 to the heavy-duty vehicle main member. Alternatively, top plate 143 may be mounted directly to the main member of the heavy-duty vehicle in a known manner. Shock absorber 40 is mounted at a top end on an inboardly-extending wing 17 of hanger 16 via a mounting bracket 19 and a fastener 15. The bottom end of shock absorber 40 is mounted to beam 18, as is known.

Figure 1A:
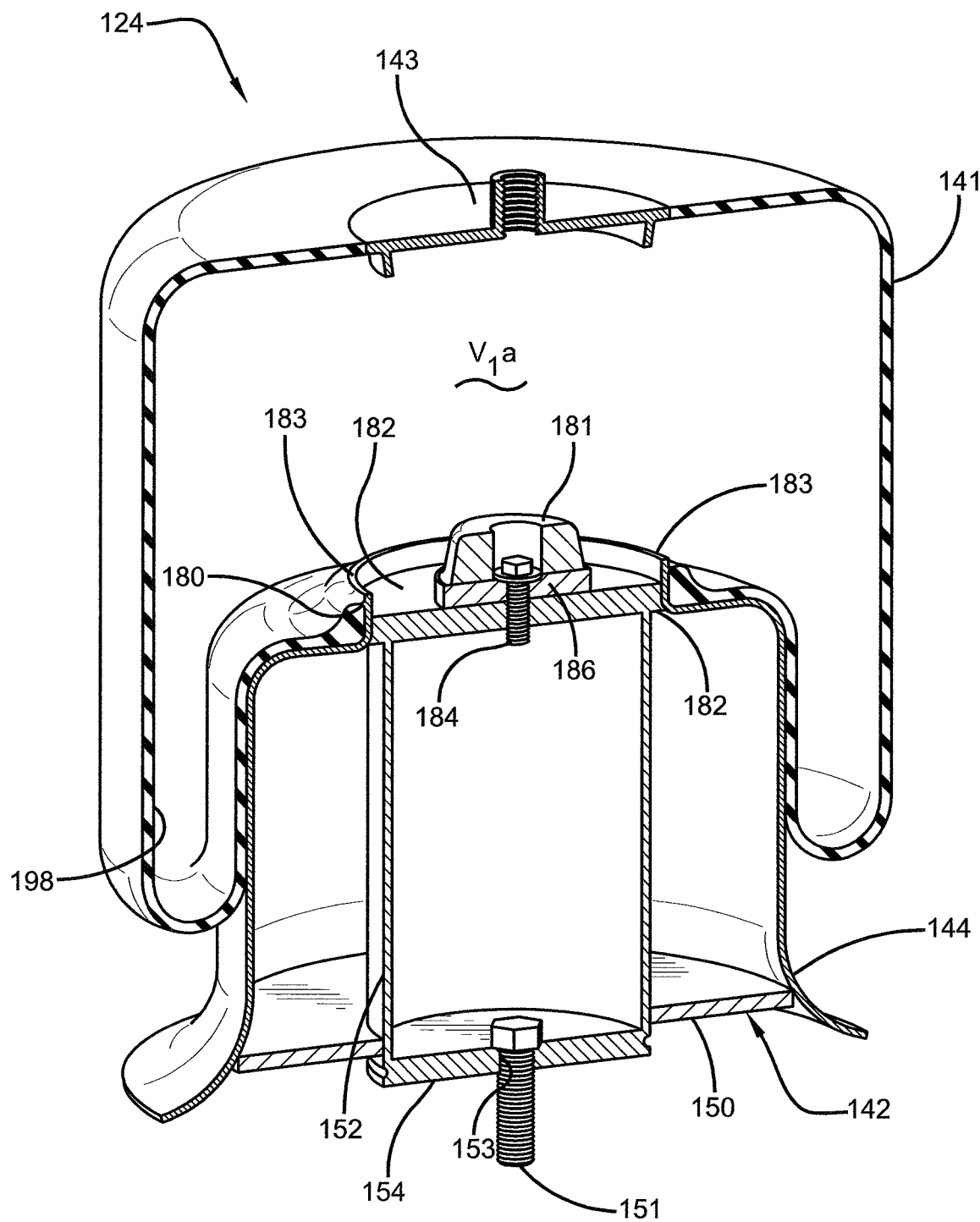
FIG. 1A is a perspective view, in section, of a prior art non-damping air spring, showing the bellows chamber isolated from the piston chamber.
Figure 1B:
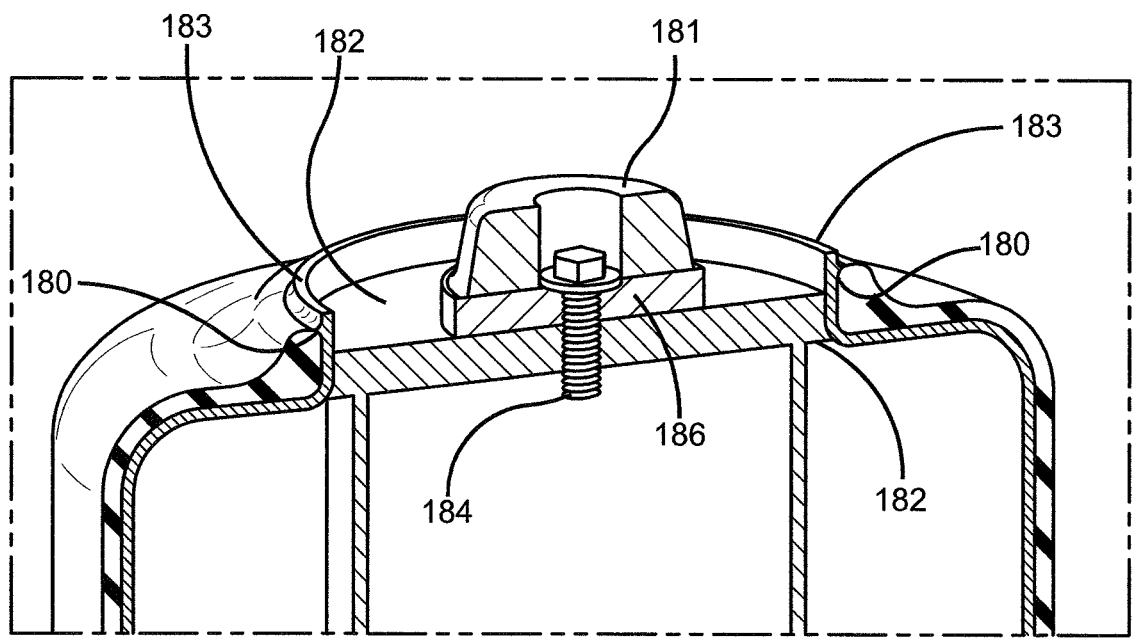
FIG. 1B is an enlarged perspective view, in section of the prior art non-damping air spring, shown in FIG. 1A, showing the bellows retained to the piston top plate by the lip.

With additional reference to FIGS. 1A and 1B, piston 142 is generally cylindrical-shaped and includes an integrally formed top plate 182 and a continuous generally stepped sidewall 144 attached to a generally flat bottom plate 150. Top plate 182 of piston 142 is formed with a circular upwardly-extending protrusion 183 having a lip 180 formed about its circumference. Lip 180 cooperates with the lowermost end of bellows 141 to form an airtight seal between the bellows and the lip, as is known. Bellows 141, top plate 143, and piston top plate 182 define a bellows chamber 198 having an internal volume $V_1a$ in the range of from about 305 in.$^3$ to about 915 in.$^3$ at standard static ride height. Bottom plate 150 is formed with an upwardly-extending central hub 152. Central hub 152 includes a bottom plate 154 formed with a central opening 153. A fastener 151 is disposed through opening 153 in order to attach piston 142 to beam top plate 65 at beam rear end 26.

A bumper 181 is rigidly attached to a bumper mounting plate 186 in a known manner. Bumper mounting plate 186 is in turn mounted on piston top plate 182 by a fastener 184. Bumper 181 extends upwardly from the top surface of bumper mounting plate 186. Bumper 181 serves as a cushion between piston top plate 182 and bellows top plate 143 in order to keep the plates from contacting one another, which can potentially cause damage to the plates during air pressure loss or extreme jounce events during operation of the heavy-duty vehicle.

Prior art axle/suspension system 10 is designed to absorb forces that act on the heavy-duty vehicle during operation. In particular, it is desirable for axle/suspension system 10 to be rigid or stiff in order to resist roll forces and, thus, provide roll stability for the heavy-duty vehicle. This is typically accomplished using beam 18, which is rigid and rigidly attached to axle 32. However, it is also desirable for axle/suspension system 10 to be flexible to assist in cushioning the heavy-duty vehicle from vertical impacts and provide the axle/suspension system with compliance to resist failure. Such flexibility typically is achieved through the pivotal connection of beam 18 to hanger 16 utilizing bushing assembly 22. In addition, air spring 124 cushions the ride of the heavy-duty vehicle for cargo and passengers while shock absorber 40 assists in controlling the ride of the heavy-duty vehicle. By adjusting the relative size of bellows chamber volume $V_1a$, it is possible to tune the stiffness of air spring 124, thereby altering the cushioning characteristics the air spring provides.

As set forth above, prior art non-damping air spring 124 exhibits certain disadvantages, drawbacks, and limitations. For example, prior art non-damping air spring 124 relies on shock absorber 40 to provide damping characteristics during operation of the heavy-duty vehicle. As a result, non-damping air spring 124 cushions the ride of the vehicle, while shock absorber 40 provides damping to axle/suspension system 10. The addition of shock absorber 40 adds weight and complexity to axle/suspension system 10, potentially increasing cost and reducing the payload capacity of the heavy-duty vehicle. Moreover, shock absorber 40 is designed to provide optimal damping for a rated load of the heavy-duty vehicle. As a result, shock absorber 40 may not provide optimal damping for the heavy-duty vehicle in under- or over-loaded situations, which can adversely affect performance, ride, and/or durability of suspension assembly 14. Furthermore, the damping performance of shock absorber 40 decreases over time, such that the shock absorber eventually requires maintenance or replacement, creating additional costs.

Figure 2:
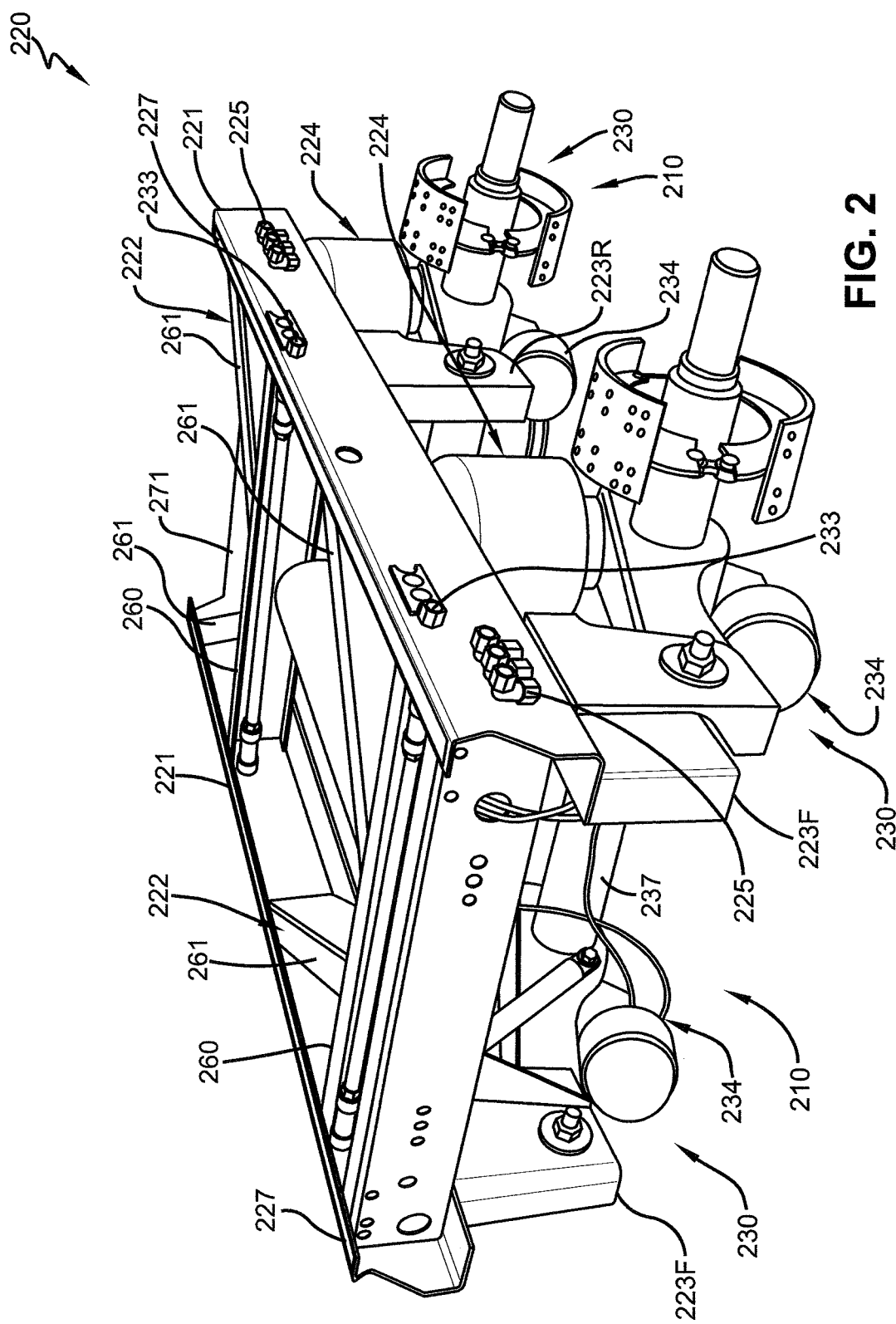
FIG. 2 is a front driver-side perspective view of a slider for a heavy-duty vehicle incorporating a pair of prior art non-optimized axle/suspension systems utilizing damping air springs.

A non-optimized prior art beam-type air-ride axle/suspension system 210 (FIGS. 2-2D) with damping air spring 224 is shown incorporated into a slider 220 in FIG. 2. Slider 220 includes a pair of main members 221, a pair of generally K-shaped cross member structures 222, and a pair of front hangers 223F and rear hangers 223R (only one shown) for suspending front and rear axle/suspension systems 210.

Specifically, each main member 221 is an elongated generally C-shaped beam made from metal such as steel or other suitable material. The open portion of each main member 221 is opposed to the open portion of the other main member and faces inboard relative to slider box 220. Main members 221 are connected to each other in a spaced-apart parallel relationship by K-shaped cross member structures 222. Because K-shaped cross member structures 222 are generally identical to one another, for purpose of conciseness, only one of the structures will be described below.

K-shaped cross member structure 222 includes a base member 260, which extends between and is perpendicular to main members 221. Base member 260 is a generally C-shaped beam formed from metal, such as steel, or other suitable material. The open portion of base member 260 faces in a frontward direction. Each end of base member 260 nests in the open portion of a respective one of main members 221, and is secured therein by any suitable means, such as welding or mechanical fastening. Each hanger 223F, R is attached by suitable means, such as welding, to the lowermost surface of a respective one of main members 221 at a location directly beneath base member 260 of K-shaped cross member structure 222. K-shaped cross member structure 222 further includes a pair of inclined members 261, each of which is a generally C-shaped beam also formed from metal, such as steel, or other suitable materials. The open portion of each inclined member 261 faces in an outboard-frontward direction, and each of the inclined members extends between generally the middle portion of base member 260 and a respective one of main members 221. The front end of each inclined member 261 is attached to the rearward-most surface of base member 260 at a selected angle by any suitable means, such as welding or mechanical fastening. The rear end of each inclined member 261 is nested at an angle in the open portion of a respective one of main members 221 and is attached thereto by any suitable means, such as welding or mechanical fasteners. An optional reinforcement bar 271, which extends between the rearward-most ends of main members 221, adds additional strength to the structure and is attached thereto by any suitable means, such as welds or mechanical fasteners.

Each main member 221 has a pair of rail guides 225 mounted on its outboard surface by bolts (not shown). Each rail guide 225 is mounted adjacent to a respective one of the ends of main member 221. A low friction strip 227 is attached to the uppermost surface of each main member 221 by recessed fasteners (not shown), and extends generally the entire length of the main member. Strip 227 is formed of any suitable low friction material, such as ultra-high molecular weight polyethylene. Slider box 220 is movably mounted by slideable engagement of rail guides 225 with spaced apart, parallel and generally Z-shaped rails (not shown), which are mounted on and depend from the underside of the heavy-duty vehicle. Slider box 220 can be selectively positioned relative to the heavy-duty vehicle for optimum load distribution by a pair of retractable pin mechanisms 233 (FIG. 2).

Figure 2A:
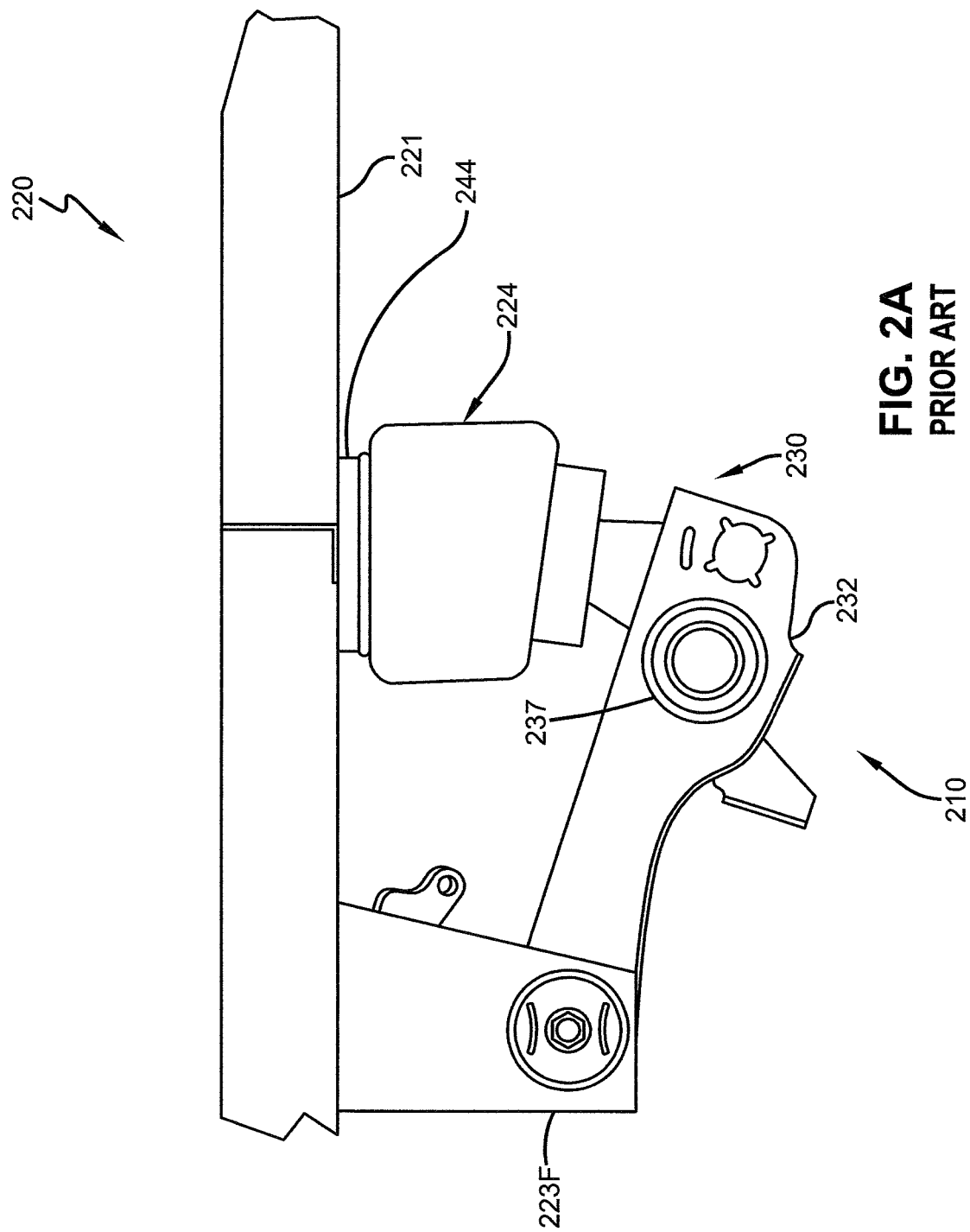
FIG. 2A is a fragmentary elevational view of the front axle/suspension system shown in FIG. 2, with the wheel ends and the brake equipment removed from the axle/suspension system.

Slider box 220 supports a pair of axle/suspension systems 210, each of which includes generally identical suspension assemblies 230 suspended from respective front and rear pairs of hangers 223F, R. With additional reference to FIG. 2A, each suspension assembly 230 includes a suspension beam 232 pivotally mounted on hanger 223F, as is known. An axle 237 with one or more wheels (not shown) mounted on each end extends between and is captured by suspension beams 232. Damping air spring 224 is suitably mounted on and extends between the upper surface of the rearward-most end of suspension beam 232 and main member 221 at a location directly beneath the outboard end of a respective one of inclined members 261 (FIG. 2) of its respective K-shaped cross member structure 222. In addition, for relative completeness, suspension assembly 230 may also include an air brake system 234 (FIG. 2).

Figure 2B:
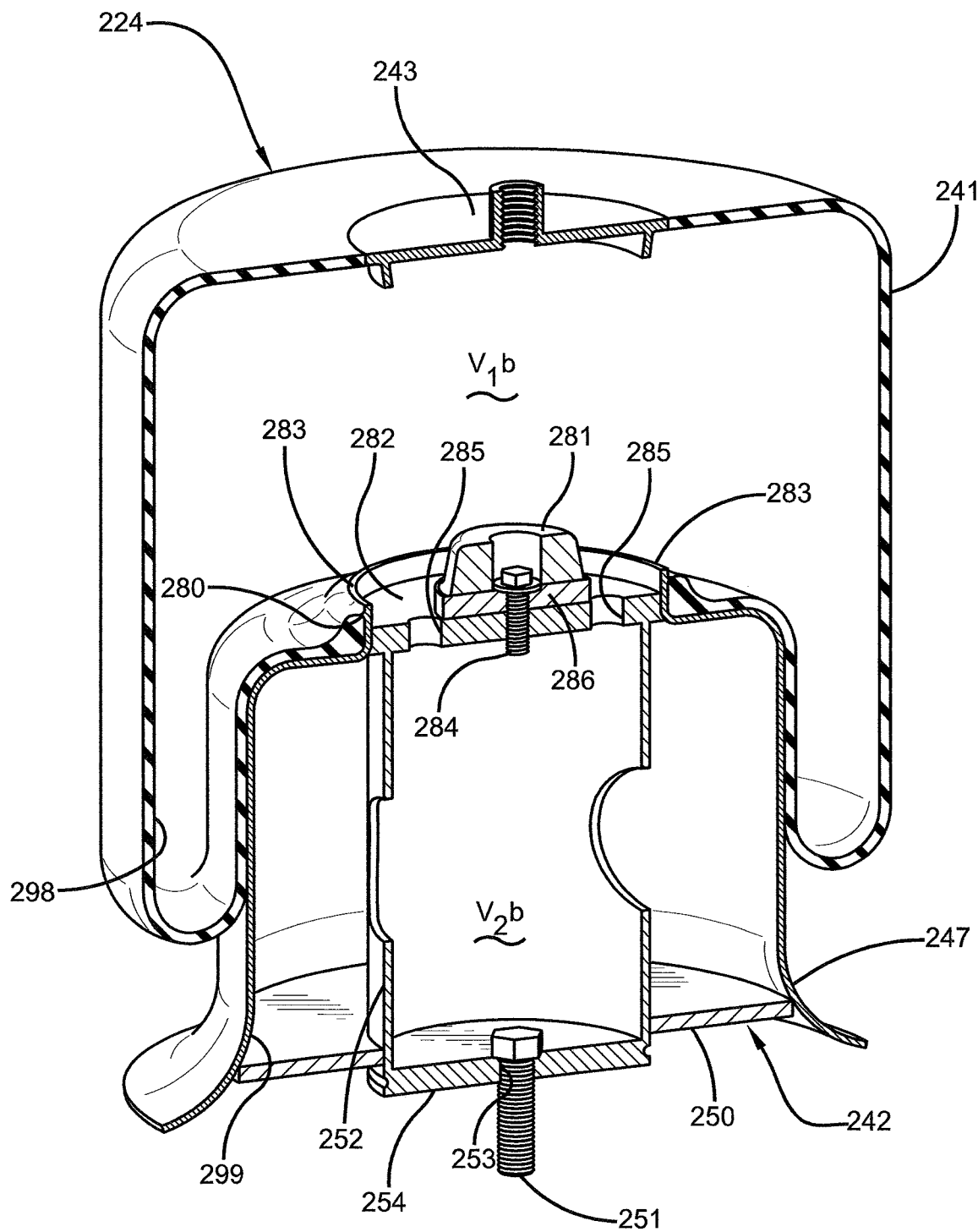
FIG. 2B is a perspective view, in section, of the prior art damping air spring shown in FIGS. 2 and 2A, showing the bellows chamber in fluid communication with the piston chamber via a pair of openings.
Figure 2C:
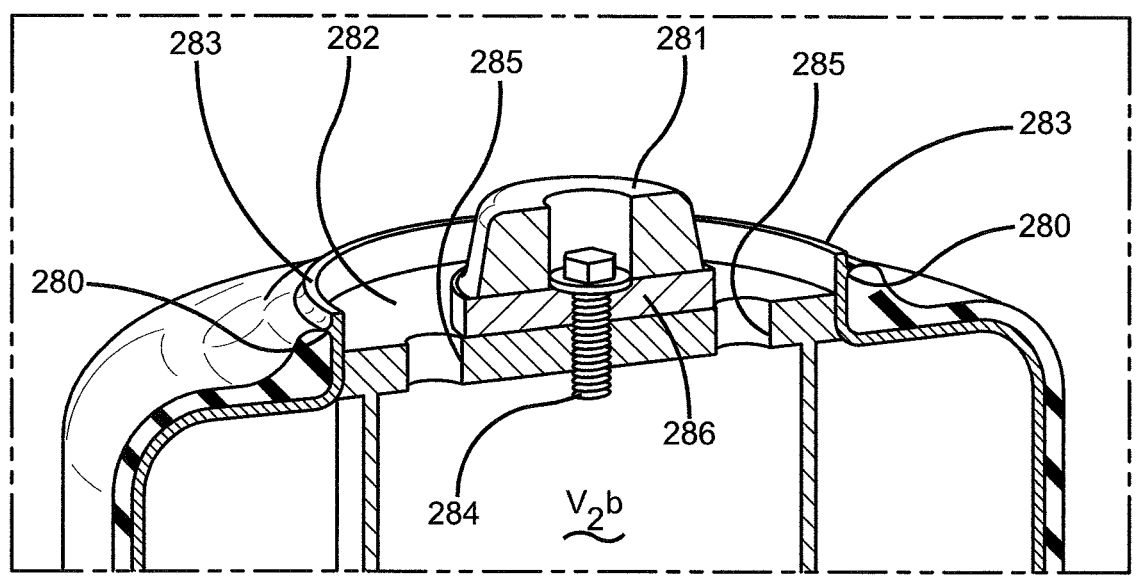
FIG. 2C is an enlarged perspective view, in section of the prior art damping air spring, shown in FIG. 2-2B, showing the bellows retained to the piston top plate by the lip.
Figure 2D:
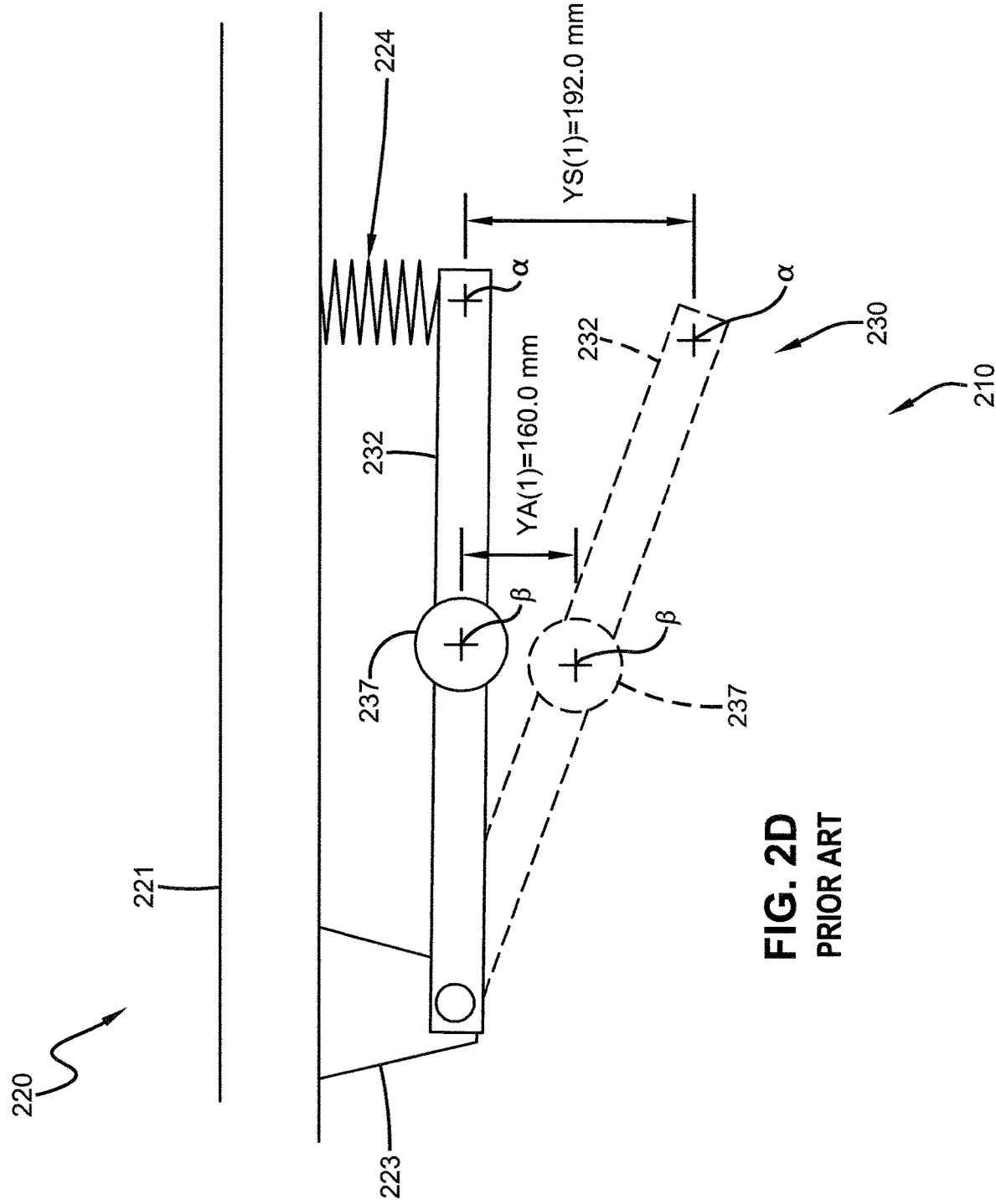
FIG. 2D is a fragmentary schematic elevational view of the prior art axle/suspension system shown in FIGS. 2 and 2A, with non-optimized damping, showing the relative location of the beam of the suspension assembly during jounce and rebound.

Turning now to FIGS. 2B-2D, prior art damping air spring 224 includes a bellows 241 and a piston 242. The top portion of bellows 241 is sealingly engaged with a bellows top plate 243. An air spring mounting plate 244 (FIG. 2A) is mounted on top plate 243 by fasteners (not shown), which are also used to mount the top portion of damping air spring 224 to main member 221 of the heavy-duty vehicle. Alternatively, top plate 243 may be directly mounted to main member 221, as is known.

Piston 242 is generally cylindrical-shaped and includes a continuous generally stepped sidewall 247 attached to a generally flat bottom plate 250 and an integrally formed top plate 282. Bottom plate 250 is formed with an upwardly-extending central hub 252. Central hub 252 includes a bottom plate 254 formed with a central opening 253. A fastener 251 is disposed through opening 253 in order to attach piston 242 to the top of beam 232 at the beam rear end (FIGS. 2-2B). Top plate 282 of piston 242 is formed with a circular upwardly-extending protrusion 283 having a lip 280 formed about its circumference. Lip 280 cooperates with the lowermost end of bellows 241 to form an airtight seal between the bellows and the lip, as is known. Top plate 282, sidewall 247, and bottom plate 250 of piston 242 define a piston chamber 299 having an internal volume $V_2b$. Bellows 241, top plate 243 and piston top plate 282 define a bellows chamber 298 having an internal volume $V_1b$. Top plate 282 is formed with a pair of openings 285, which allow volume $V_2b$ of piston chamber 299 and volume $V_1b$ of bellows chamber 298 to communicate with one another. More particularly, openings 285 allow fluid or air to pass between piston chamber 299 and bellows chamber 298 during operation of the vehicle.

A bumper 281 is rigidly attached to a bumper mounting plate 286 by means generally well known in the art. Bumper mounting plate 286 is in turn mounted on piston top plate 282 by a fastener 284. Bumper 281 extends upwardly from the top surface of bumper mounting plate 286. Bumper 281 serves as a cushion between piston top plate 282 and bellows top plate 243 in order to keep the plates from contacting one another, which can potentially cause damage to the plates during air loss or extreme jounce events during operation of the heavy-duty vehicle.

When axle 237 of axle/suspension system 210 experiences a jounce event, such as when the wheels of the heavy-duty vehicle encounter a curb or a raised bump in the road, the axle moves vertically upwardly toward the heavy-duty vehicle chassis. In such a jounce event, bellows chamber 298 is compressed by axle/suspension system 210 as the wheels of the heavy-duty vehicle travel over the curb or the raised bump in the road. The compression of bellows chamber 298 causes the internal pressure of the bellows chamber to increase, creating a pressure differential between the bellows chamber and piston chamber 299. This pressure differential causes air to flow from bellows chamber 298 through piston top plate openings 285 into piston chamber 299. The restricted flow of air between bellows chamber 298 and piston chamber 299 through piston top plate openings 285 causes damping to occur. Air continues to flow back and forth through piston top plate openings 285 until the pressures of piston chamber 299 and bellows chamber 298 have equalized.

Conversely, when axle 237 of axle/suspension system 210 experiences a rebound event, such as when the wheels of the heavy-duty vehicle encounter a large hole or depression in the road, the axle moves vertically downwardly away from the heavy-duty vehicle chassis. In such a rebound event, bellows chamber 298 is expanded by axle/suspension system 210 as the wheels travel into the hole or depression in the road. The expansion of bellows chamber 298 causes the internal pressure of the bellows chamber to decrease, creating a pressure differential between the bellows chamber and piston chamber 299. This pressure differential causes air to flow from piston chamber 299 through piston top plate openings 285 into bellows chamber 298. The restricted flow of air through piston top plate openings 285 causes damping to occur. Air will continue to flow back and forth through the piston top plate openings 285 until the pressures of piston chamber 299 and bellows chamber 298 have equalized.

Prior art damping air spring 224 provides damping characteristics to axle/suspension systems 210 and cushions the ride of the heavy-duty vehicle during operation. By adjusting the relative size of bellows chamber volume $V_1b$, the stiffness of air spring 224 can be tuned to alter the cushioning characteristics the air spring provides. Moreover, by adjusting one or more of bellows chamber volume $V_1b$, the ratio of bellows chamber volume to piston chamber volume $V_2b$, or the cross-sectional area of openings 285, it is possible to tune the level of damping achieved within constraints imposed by the load on axle/suspension system 210, thus eliminating the need for shock absorbers.

However, prior art axle/suspension system 210, while providing damping to the heavy-duty vehicle, has potential disadvantages, drawbacks, and limitations. For example, prior art axle/suspension system 210 is not optimized to provide the optimal damping energy for air spring 224 because the design of the axle/suspension system does not account for a suspension motion ratio MR of the axle/suspension system. The motion ratio MR of prior art axle/suspension system 210 is defined as the motion distance YS (FIG. 2C) of prior art damping air spring 224 divided by the motion distance YA of axle 237, as shown by the following equation:

$$MR = \frac{YS}{YA}$$

The motion distance YS of prior art damping air spring 224 is equivalent to the distance of movement of beam 232 from a jounce position to a rebound position measured at a location a on the beam where the air spring is mounted. The motion distance YA of axle 237 is equivalent to the distance of movement of the axle from a jounce position to a rebound position measured at a center-point β of the axle. As can be seen in FIG. 2C, the motion distance YS of prior art damping air spring 224 is about 192.0 mm, and the motion distance YA of axle 237 is about 160.0 mm. The motion ratio MR of axle/suspension system 210, calculated utilizing the formula above, is set forth below:

$$MR = \frac{YS}{YA} = \frac{192.0 \text{ mm}}{160.0 \text{ mm}} = 1.2$$

Therefore, the motion ratio MR of prior art axle/suspension system 210 is about 1.2. However, this motion ration MR provides axle/suspension system 210 with limited damping energy, as described in detail below, such that the axle/suspension system may have potentially reduced durability and may provide the heavy-duty vehicle with potentially reduced damping and/or ride quality.

The axle/suspension system of the present invention overcomes the disadvantages, drawbacks, and limitations of the prior art axle/suspension systems 10, 210 by providing a structure and method for optimizing an axle/suspension system for a damping air spring utilizing the motion ratio of the axle/suspension system. In particular, in accordance with the present invention, it has been observed that the damping characteristics of damping air springs, such as prior art damping air spring 224, can be influenced by the motion ratio MR of an axle/suspension system, such as prior art axle/suspension system 210. More particularly, the damping characteristics of any air spring can be measured using simulation models or empirical tests in order to determine the damping energy of the air spring.

Figure 4:
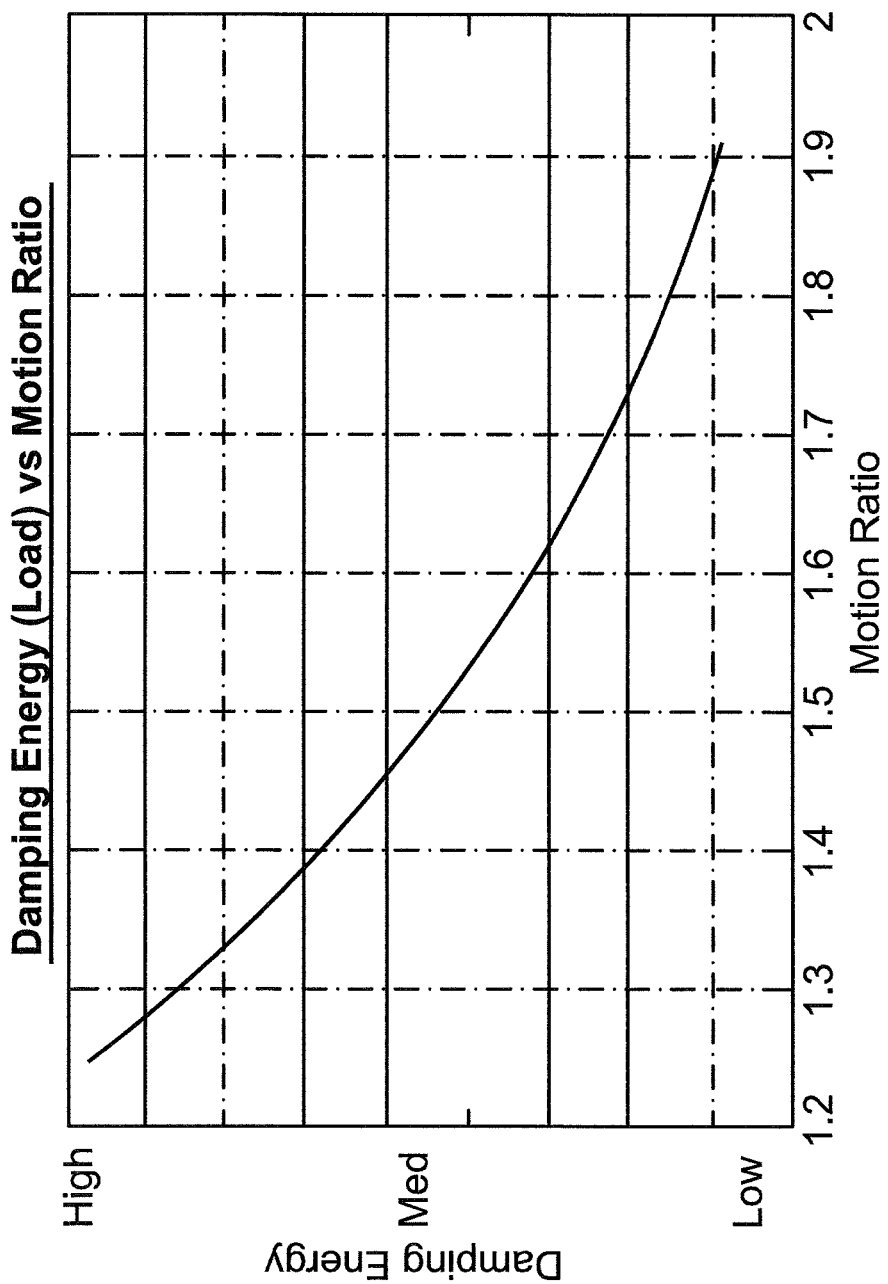
FIG. 4 is a graph showing the damping energy due to load (pressure) versus motion ratio for the damping air spring shown in FIGS. 3-3D.
Figure 5:
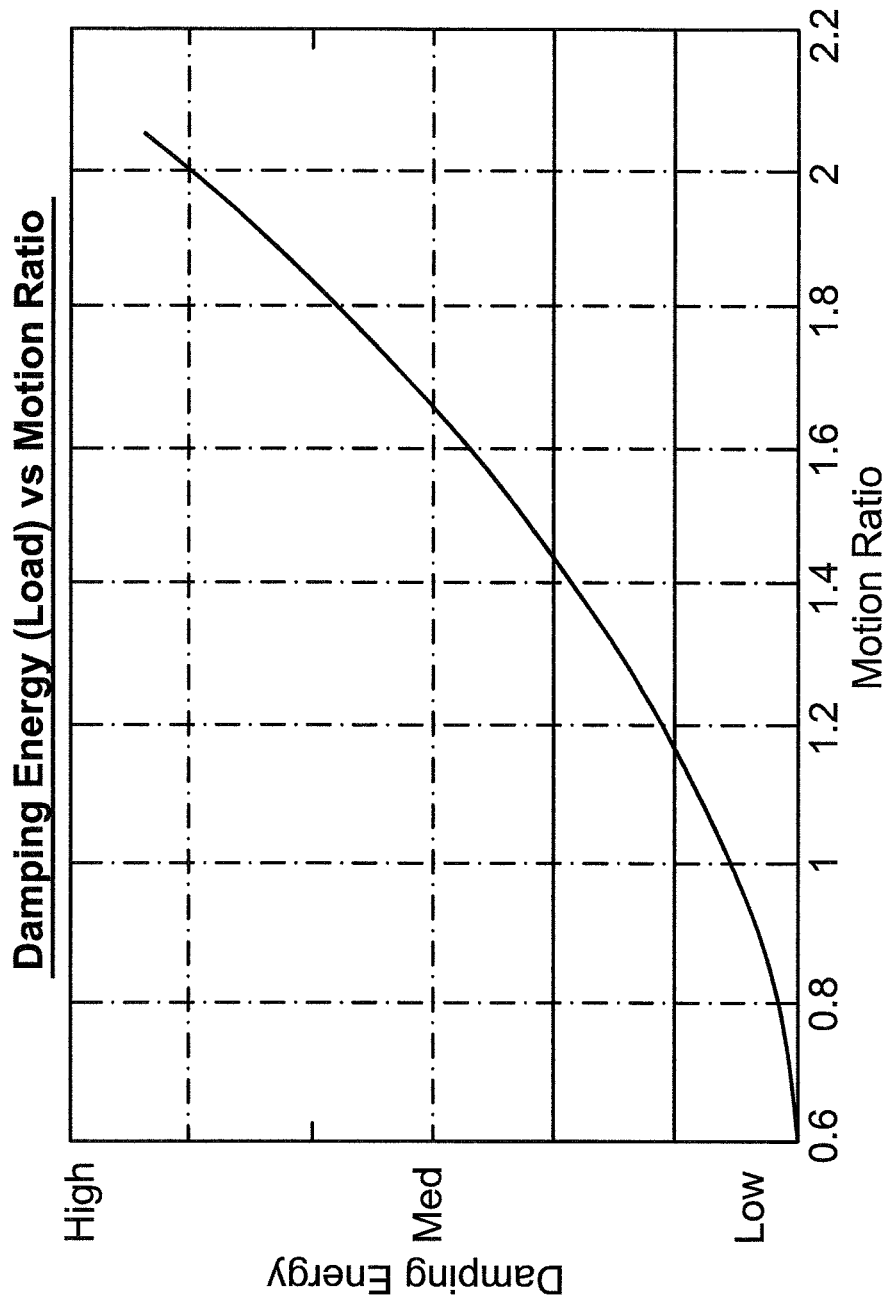
FIG. 5 is a graph showing the damping energy due to velocity of air through the pair of openings of the damping air spring shown in FIGS. 3-3D versus motion ratio for the damping air spring shown in FIGS. 3-3D.

It has also been observed that the damping energy of any air spring increases when the density or pressure of the air spring air volume, which is directly affected by load, increases, and when the flow rate or air velocity through the orifices fluidly connecting the bellows chamber to the piston chamber within an air spring increases. Specifically, by increasing the motion ratio MR of an axle/suspension system, the load on a damping air spring decreases, thereby decreasing the pressure or density of the air volume contained in the damping air spring and reducing the damping energy as seen in FIG. 4. However, due to increased spring deflection and/or velocity, increasing the motion ratio MR of an axle/suspension system also increases the velocity of air flowing through the openings fluidly connecting the bellows chamber of a damping air spring to the piston chamber, thereby increasing the damping energy as seen in FIG. 5. Thus, an optimal damping energy exists for any spring at a motion ratio MR where damping energy due to air velocity is first limited by the reduction in density of the volume of air in the air spring.

Figure 6:
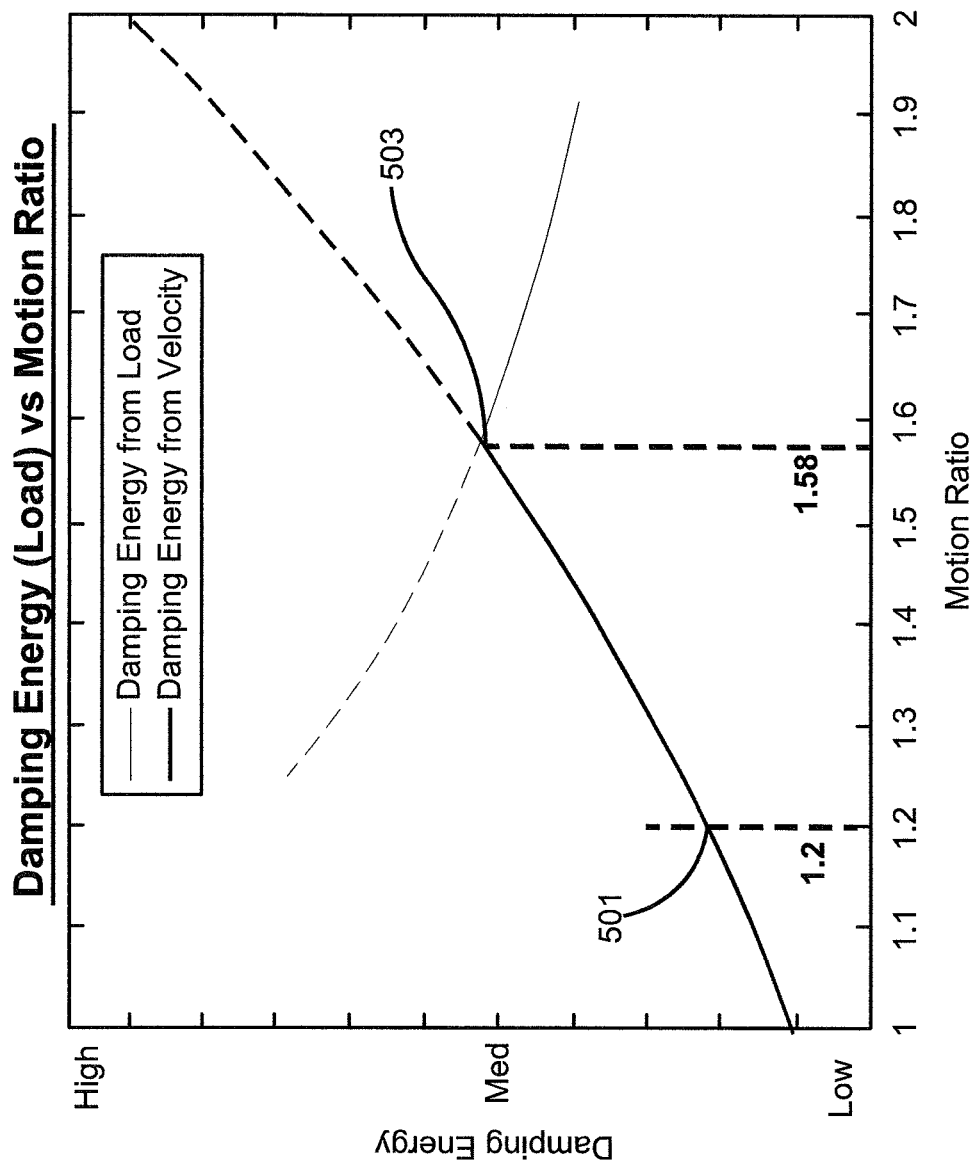
FIG. 6 is a graph showing the damping energy due to load and the damping energy due to velocity of air through the pair of openings versus motion ratio for the damping air spring incorporated into the axle/suspension system shown in FIG. 3D.

For example, the damping energy of prior art non-optimized damping air spring 224 is indicated at reference numeral 501 of the graph shown in FIG. 6. As shown in FIG. 6, providing axle/suspension system 210 with an increased motion ratio MR will typically increase the damping energy of air spring 224 from a first point 501 up to a second point 503. As the damping energy of air spring 224 approaches second point 503 the increased air velocity through the openings between bellows chamber 289 and piston chamber 299 is limited or overcome by the reduction in density of the air volume in the air spring and begins to decrease. Thus, an axle/suspension system can be optimized to provide optimal damping energy by altering the motion ratio MR of the axle/suspension system for a given air spring.

Figure 3:
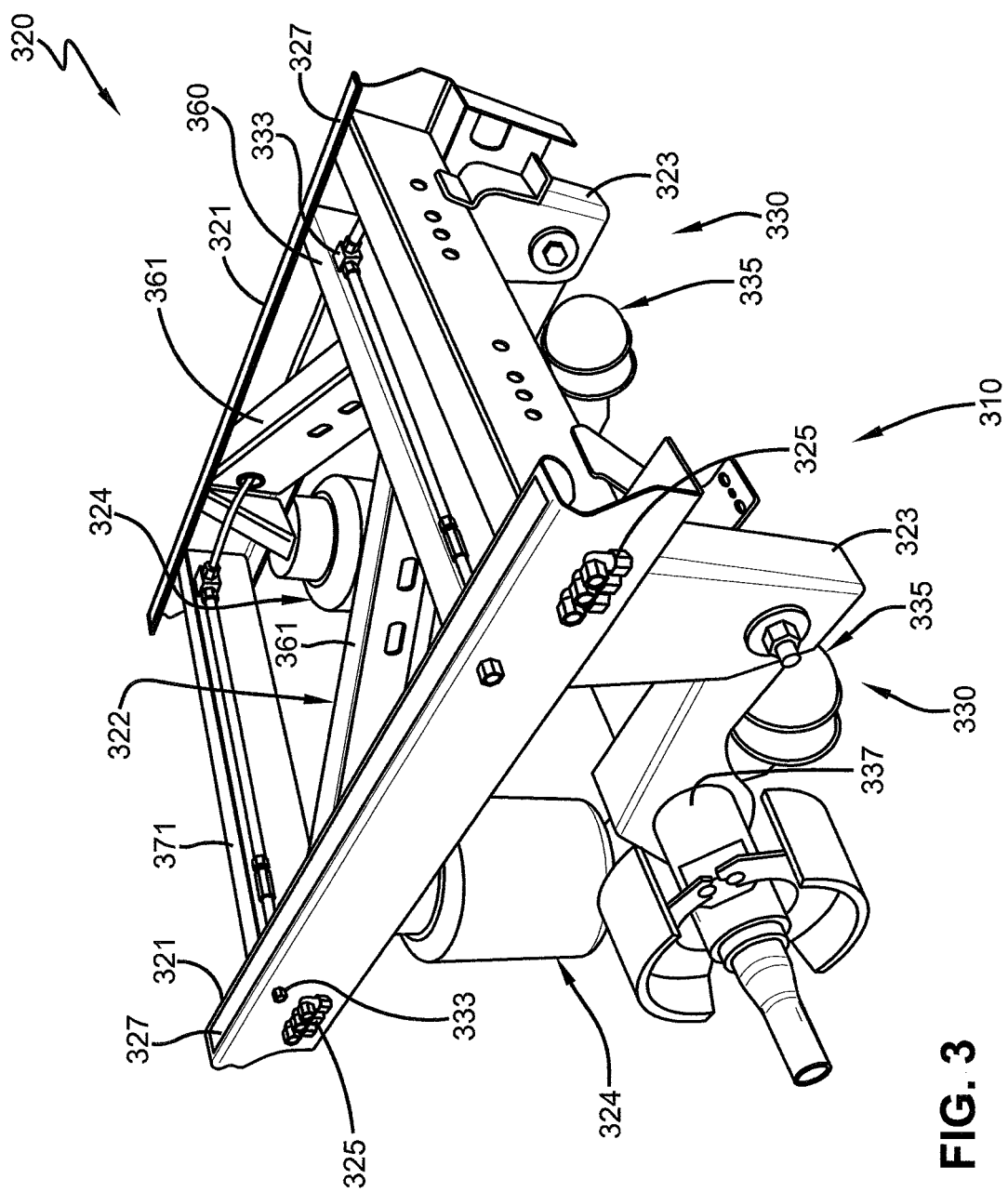
FIG. 3 is a front curb-side fragmentary perspective view of a slider for a heavy-duty vehicle incorporating an axle/suspension system with optimized damping, according to the present invention, showing the axle/suspension system utilizing a damping air spring.
Figure 3A:
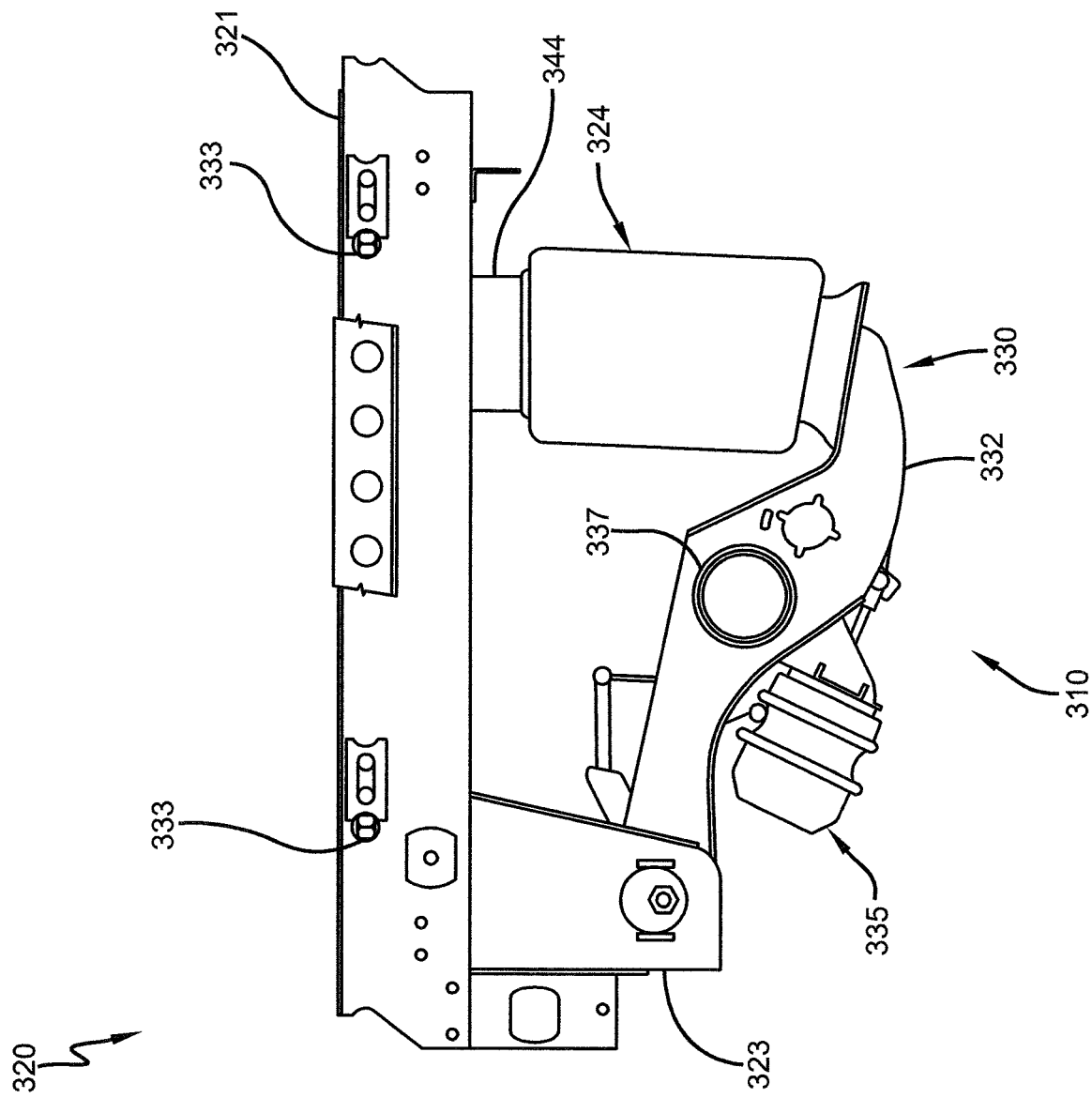
FIG. 3A is a fragmentary elevational view of the slider and axle/suspension system shown in FIG. 3, with the wheel ends removed from the axle/suspension system.
Figure 3B:
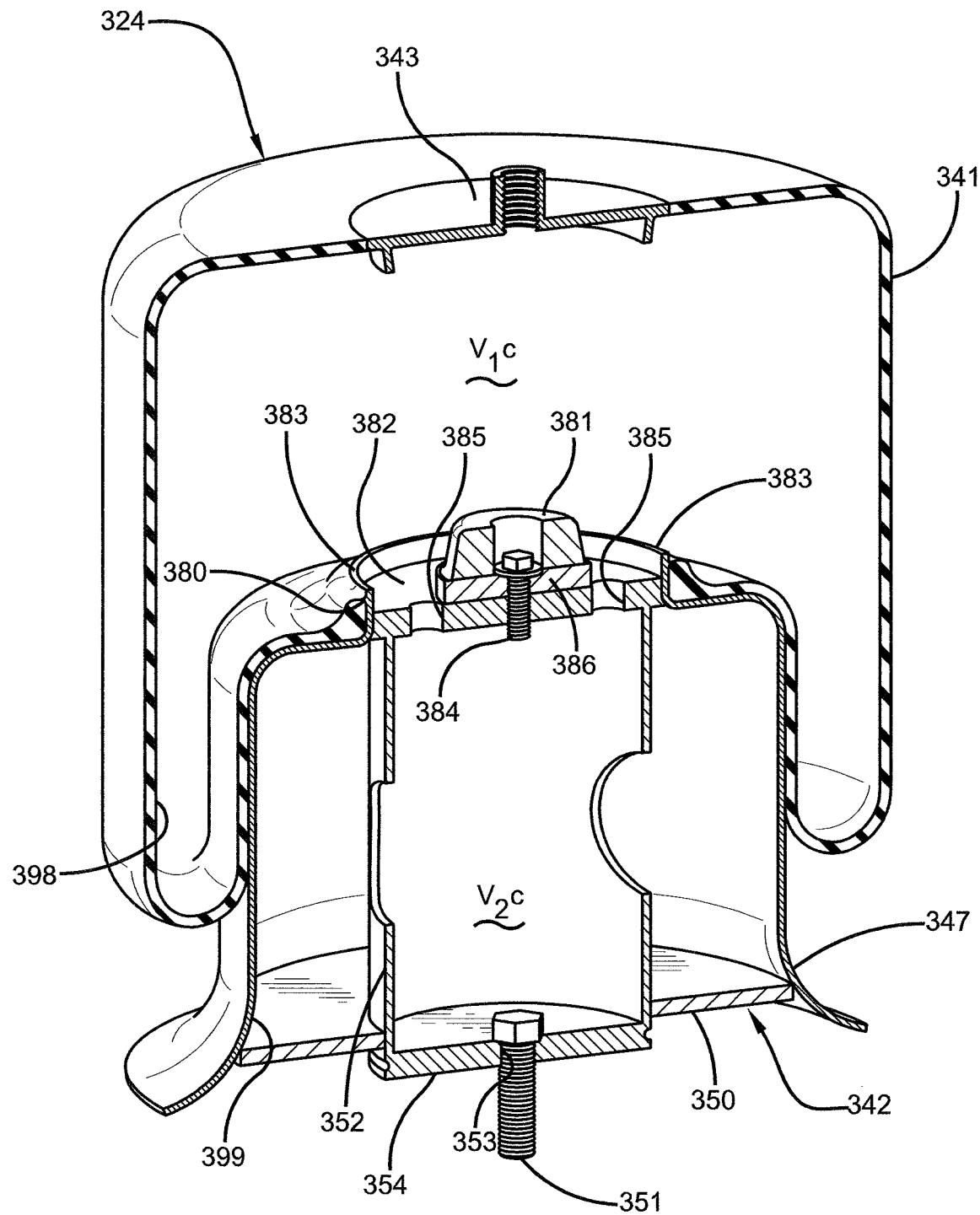
FIG. 3B is a perspective view, in section, of the damping air spring shown in FIGS. 3 and 3A, showing the bellows chamber in fluid communication with the piston chamber via a pair of openings.
Figure 3C:
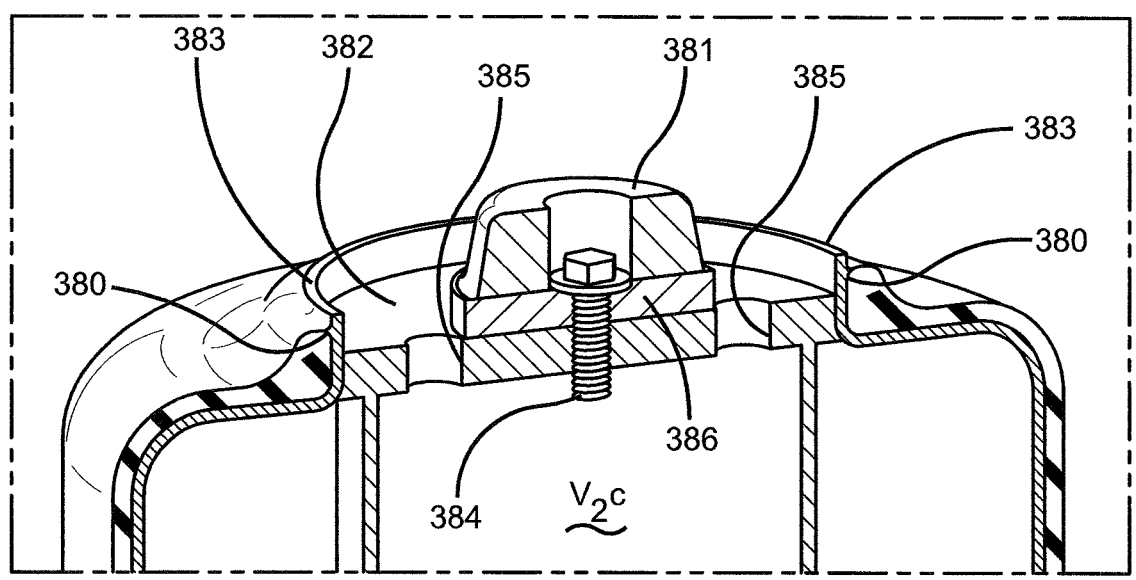
FIG. 3C is an enlarged perspective view, in section of the damping air spring, shown in FIGS. 3-3B, showing the bellows retained to the piston top plate by the lip.
Figure 3D:
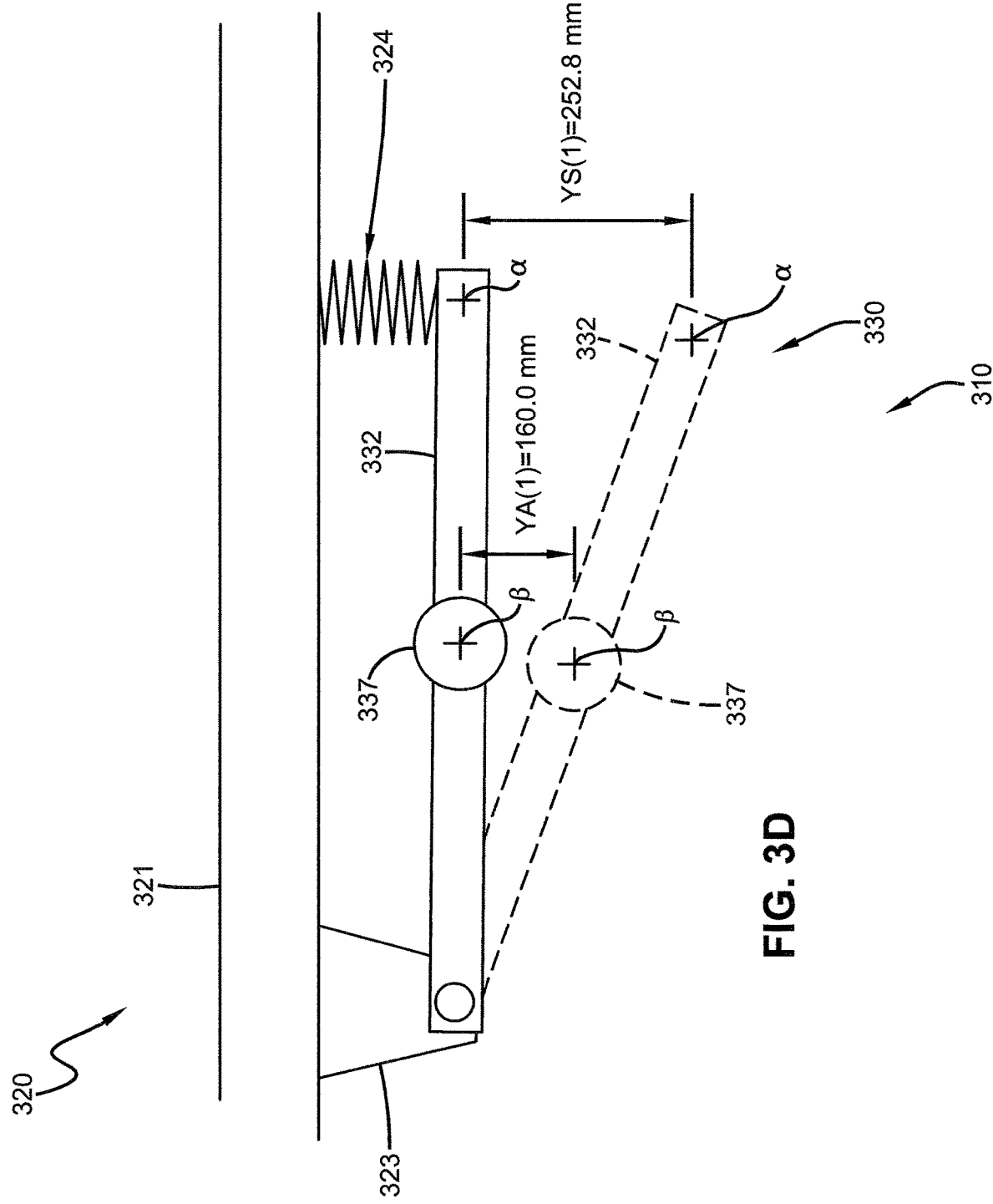
FIG. 3D is a fragmentary schematic elevational view of the axle/suspension system with optimized damping shown in FIGS. 3 and 3A, showing the relative location of the beam of the suspension assembly during jounce and rebound.

An axle/suspension system 310 with optimized damping, according to the present invention, is shown in FIGS. 3-3D incorporated into a slider 320 for a heavy-duty vehicle. Slider 320 includes a pair of main members 321, a generally K-shaped cross member structure 322, and a pair of hangers 323 for suspending axle/suspension system 310. More specifically, each main member 321 is an elongated generally C-shaped beam made from metal, such as steel, or other suitable materials. The open portion of each main member 321 is opposed to the open portion of the other main member and faces inboard relative to slider box 320. Main members 321 are connected to each other in a spaced-apart parallel relationship by K-shaped cross member structure 322.

K-shaped cross member structure 322 includes a base member 360, which extends between and is perpendicular to main members 321. Base member 360 is a generally C-shaped beam formed from metal, such as steel, or other suitable materials. The open portion of base member 360 faces in a frontward direction. Each end of base member 360 nests in the open portion of a respective one of main members 321, and is secured therein by any suitable means, such as welds or mechanical fasteners. Each hanger 323 is attached by suitable means, such as welds, to the lowermost surface of a respective one of main members 321 at a location directly beneath base member 360 of K-shaped cross member structure 322. K-shaped cross member structure 322 further includes a pair of inclined members 361, each of which is a generally C-shaped beam also formed from metal, such as steel, or other suitable materials. The open portion of each inclined member 361 faces in an outboard-frontward direction, and each of the inclined members extends between generally the middle portion of base member 360 and a respective one of main members 321. The front end of each inclined member 361 is attached to the rearward-most surface of base member 360 at a selected angle by any suitable means, such as welds or mechanical fasteners. The rear end of each of inclined members 361 is nested at an angle in the open portion of a respective one of main members 321 and is also attached thereto by any suitable means, such as welds or mechanical fasteners. An optional reinforcement bar 371 extends between the rearward-most ends of main members 321, adds additional strength to the structure, and is attached thereto by any suitable means, such as welds or mechanical fasteners.

Each main member 321 has a pair of rail guides 325 mounted on its outboard surface by bolts (not shown). Each rail guide 325 is mounted adjacent to a respective one of the ends of main member 321. A low friction strip 327 is attached to the uppermost surface of each main member 321 by recessed fasteners (not shown), and extends generally the entire length of the main member. Strip 327 is formed of any suitable low friction material, such as ultra-high molecular weight polyethylene. Slider box 320 is movably mounted on the heavy-duty vehicle (not shown) by slideable engagement of rail guides 325 with spaced apart, parallel and generally Z-shaped rails (not shown) mounted on, and depending from, the underside of the heavy-duty vehicle. Slider box 320 can be selectively positioned relative to the heavy-duty vehicle for optimum load distribution by a retractable pin mechanism 333.

As mentioned above, slider box 320 supports a single axle/suspension system 310. Axle/suspension system 310 includes generally mirror image suspension assemblies 330, each depending from a respective hanger 323.

With additional reference to FIG. 3A, each suspension assembly 330 includes a suspension beam 332 pivotally mounted on hanger 323, as is known. An axle 337, having one or more wheels (not shown) mounted on each end, extends between and is captured by the pair of suspension beams 332. An air spring 324 with damping characteristics is suitably mounted on and extends between the upper surface of the rearward-most end of suspension beam 332 and main member 321 at a location directly beneath the outboard end of a respective one of inclined members 361 of K-shaped cross member structure 322. For the sake of relative completeness, suspension assembly 330 also includes an air brake system 335.

Turning now to FIGS. 3B-3D, damping air spring 324 includes a bellows 341 and a piston 342. The top portion of bellows 341 is sealingly engaged with a bellows top plate 343. An air spring mounting plate 344 (FIG. 3A) is mounted on top plate 343 by fasteners (not shown), which are also used to mount the top portion of damping air spring 324 to main member 321 of the heavy-duty vehicle. Alternatively, mounting top plate 343 may be mounted directly to main member 321 in a known manner.

Piston 342 is generally cylindrical-shaped and includes a continuous generally stepped sidewall 347 attached to a generally flat bottom plate 350 and an integrally formed top plate 382. Bottom plate 350 is formed with an upwardly-extending central hub 352. Central hub 352 includes a bottom plate 354 formed with a central opening 353. A fastener 351 is disposed through opening 353 in order to attach piston 342 to the top of beam 332 at the beam rear end. Top plate 382, sidewall 347, and bottom plate 350 of piston 342 define a piston chamber 399 having an internal volume $V_2c$. More particularly, at standard static ride height piston chamber volume $V_2c$ may be in the range from about 150 in.$^3$ to about 550 in.$^3$. Top plate 382 of piston 342 is formed with a circular upwardly-extending protrusion 383 having a lip 380 around its circumference. Lip 380 cooperates with the lowermost end of bellows 341 to form an airtight seal between the bellows and the lip, as is known. Bellows 341, top plate 343, and piston top plate 382 define a bellows chamber 398 having an internal volume $V_1c$ at standard static ride height. More particularly, at standard static ride height bellows chamber volume $V_1c$ may be in the range from about 305 in.$^3$ to about 915 in.$^3$.

Piston top plate 382 is formed with a pair of openings 385, which allow fluid communication between piston chamber volume $V_2c$ and bellows chamber volume $V_1c$ during operation of the heavy-duty vehicle. Piston top plate openings 385 have a combined cross-sectional area of from about 0.039 in$^2$ to about 0.13 in$^2$. The ratio of the cross-sectional area of openings 385 measured in square inches (in.$^2$) to the volume of piston chamber 399 measured in cubic inches (in.$^3$) to the volume of bellows chamber 398 measured in cubic inches (in.$^3$) is in the range of ratios of from about 1:600:1200 to about 1:14100:23500.

A bumper 381 is rigidly attached to a bumper mounting plate 386 in a known manner. Bumper mounting plate 386 is in turn mounted on piston top plate 382 by a fastener 384. Bumper 381 extends upwardly from the top surface of bumper mounting plate 386. Bumper 381 serves as a cushion between piston top plate 382 and bellows top plate 343 in order to keep the plates from contacting one another, which can potentially cause damage to the plates during air loss or extreme jounce events during operation of the heavy-duty vehicle.

When axle 337 of axle/suspension system 310 experiences a jounce event, such as when the vehicle wheels encounter a curb or a raised bump in the road, the axle moves vertically upwardly toward the vehicle chassis. In such a jounce event, bellows chamber 398 is compressed by axle/suspension system 310 as the wheels of the vehicle travel over the curb or the raised bump in the road. The compression of bellows chamber 398 causes the internal pressure of the bellows chamber to increase, creating a pressure differential between the bellows chamber and piston chamber 399. This pressure differential causes air to flow from bellows chamber 398 through piston top plate openings 385 into piston chamber 399. The restricted flow of air between bellows chamber 398 and piston chamber 399 through piston top plate openings 385 causes damping to occur. Air continues to flow back and forth through piston top plate openings 385 until the pressures of piston chamber 399 and bellows chamber 398 have equalized.

Conversely, when axle 337 of axle/suspension system 310 experiences a rebound event, such as when the vehicle wheels encounter a large hole or depression in the road, the axle moves vertically downwardly away from the vehicle chassis. In such a rebound event, bellows chamber 398 is expanded by axle/suspension system 310 as the wheels of the vehicle travel into the hole or depression in the road. The expansion of bellows chamber 398 causes the internal pressure of the bellows chamber to decrease, creating a pressure differential between the bellows chamber and piston chamber 399. This pressure differential causes air to flow from piston chamber 399 through piston top plate openings 385 into bellows chamber 398. The restricted flow of air through piston top plate openings 385 causes damping to occur. Air will continue to flow back and forth through the piston top plate openings 385 until the pressures of piston chamber 399 and bellows chamber 398 have equalized.

Damping air spring 324 provides damping characteristics to axle/suspension system 310 during operation of the heavy-duty vehicle, cushioning the ride of the heavy-duty vehicle. By adjusting the relative size of bellows chamber volume $V_1c$, it is possible to tune the stiffness of air spring 324 to alter the cushioning characteristics it provides. By adjusting one or more of bellows chamber volume $V_1c$, the ratio of bellows chamber volume $V_1c$ to piston chamber volume $V_2c$, or the cross-sectional area of openings 385, it is possible to tune the level of damping that is achieved within constraints imposed by the load and a motion ratio MR of axle/suspension system 310, thus eliminating the need for shock absorbers.

Moreover, the damping features of damping air spring 324 of axle/suspension system 310 can be used with the motion ratio MR of the axle/suspension system to achieve optimal damping energy. In particular, the geometry of certain components of axle suspension/system 310, including the position of beam 332, damping air spring 324, and axle 337, relative to one another is such that the motion ration MR of axle/suspension system 310 allows damping air spring 324 to provide optimal damping. This optimization is accomplished by moving the damping air spring 324 to a different location a on the beam 332 or by changing the motion distance YS of the damping air spring from 192.0 mm, as shown in the prior art, to 252.8 mm, as shown in FIG. 3C, in order to change the motion ratio MR of axle/suspension system 310 into the desired range of from about 1.4 to about 1.7.

$$MR = \frac{YS}{YA} = \frac{252.8 \text{ mm}}{160.0 \text{ mm}} = 1.58$$

The desired range of motion ratio MR may be achieved by changing the motion distance YS of damping air spring 324, as described above, or by moving the location of axle 337 forward relative to beam 332 to decrease the motion distance YA of the axle to about 121.5. The motion ratio MR of axle/suspension system 310 would thus be changed and could then be calculated utilizing the formula:

$$MR = \frac{YS}{YA} = \frac{192.0 \text{ mm}}{121.5 \text{ mm}} = 1.58$$

Thus, the geometry of components of axle suspension/system 310, including the position of beam 332, damping air spring 324, and axle 337 relative to one another, could be altered or changed so that the axle/suspension system has a preferred motion ratio MR of from about 1.4 to about 1.7 to allow damping air spring 324 to provide optimal damping to axle/suspension system 310.

Modifying axle suspension system 310 having damping air spring 324 to achieve optimal damping for the heavy-duty vehicle may involve the following general steps. Determining the motion ratio MR of axle/suspension system 310 in combination with damping air spring 324. Determining the damping energy due to load versus motion ratio MR of axle/suspension system 310 and damping air spring 324 combination. Determining the damping energy due to velocity of air through openings 385 fluidly connecting bellows chamber 389 to piston chamber 399 versus motion ratio MR of the axle/suspension system 310 and damping air spring 324 combination. Determining the point at which the damping energy due to increased flow rate or velocity is overcome by the reduction in density of the volume of air in the air spring, providing an optimal damping energy. Determining the motion ratio MR of axle/suspension system 310 and damping air spring 324 combination associated with the optimal damping energy. Modifying the motion ratio MR of axle/suspension system 310 in order to provide an optimized damping energy for the axle/suspension system. Accordingly, damping air spring 324 connected to axle/suspension system 310, which has a motion ratio of 1.58 at 503, should have an optimal damping energy, such that increasing or decreasing the motion ratio MR of the axle/suspension system would result in decreased damping energy, as shown in FIG. 6.

Thus, axle/suspension system 310 with optimized damping, according to the present invention, overcomes the disadvantages, drawbacks, and limitations of the prior art by utilizing the motion ratio MR of the axle/suspension system and allowing the motion ratio of the axle/suspension system to be modified for a given damping air spring, such as air spring 324, to provide optimal damping, thereby improving performance, ride characteristics, and durability of the axle/suspension system during operation of the heavy-duty vehicle.

It is contemplated that axle/suspension system 310 with optimized damping of the present invention could be utilized on all heavy-duty vehicles, having one or more than one axle, without changing the overall concept or operation of the present invention. It is further contemplated that axle/suspension system 310 with optimized damping, according to the present invention, could be utilized on vehicles having frames or subframes which are moveable or non-movable without changing the overall concept or operation of the present invention. It is contemplated that axle/suspension system 310 with optimized damping, according to the present invention, could be utilized on other types of air-ride axle/suspension systems with different configurations than those shown and described, including those with trailing- or leading-arm configurations with top-mount or bottom-mount, underslung, overslung, or pass-through beams, without changing the overall concept or operation of the present invention. It is also contemplated that axle/suspension system 310 with optimized damping, according to the present invention, could be used with all types of damping air springs, without changing the overall concept or operation of the present invention.

Accordingly, axle/suspension system 310 with optimized damping is simplified, provides an effective, safe, inexpensive, and efficient structure and method which achieves all the enumerated objectives, provides for eliminating difficulties encountered with prior axle/suspension systems, and solves problems and obtains new results in the art.

The present invention has been described with reference to specific embodiments. It is to be understood that this description and illustration is by way of example and not by way of limitation. Potential modifications and alterations will occur to others upon a reading and understanding of this disclosure, and it is understood that the invention includes all such modifications, alterations, and equivalents thereof.

In the foregoing description, certain terms have been used for brevity, clearness, and understanding, but no unnecessary limitations are to be implied therefrom beyond the requirements of the prior art because such terms are used for descriptive purposes and intended to be broadly construed. Moreover, the description and illustration of the invention is by way of example, and the scope of the invention is not limited to the exact details shown or described.

Having now described the features, discoveries and principles of the invention, the manner in which axle/suspension system 310 with optimized damping is used and installed; the characteristics of the construction, arrangement, and method steps; and the advantageous, new and useful results obtained, the new and useful structures, devices, elements, arrangements, process, parts and combinations are set forth in the appended claims.

What is claimed is:

1. An axle/suspension system for a heavy-duty vehicle comprising:
   a suspension assembly operatively connected to said heavy-duty vehicle;
   an axle operatively connected to the suspension assembly; and
   a damping means operatively connected to and extending between the suspension assembly and said heavy-duty vehicle, said axle/suspension system having a motion ratio of between about 1.4 to about 1.7.

2. The axle/suspension system for a heavy-duty vehicle of claim 1, the motion ratio being a ratio of a vertical distance traveled by the damping means divided by a vertical distance traveled by the axle.

3. The axle/suspension system for a heavy-duty vehicle of claim 2, the vertical distance traveled by the damping means being between 130 mm to 320 mm.

4. The axle/suspension system for a heavy-duty vehicle of claim 2, the vertical distance traveled by the axle being between 90 mm and 190 mm.

5. The axle/suspension system for a heavy-duty vehicle of claim 1, the damping means further comprising a damping air spring including
   a bellows chamber having a first volume;
   at least one additional chamber having a second volume; and
   at least one opening in fluid communication with the bellows chamber and the at least one additional chamber.

6. The axle/suspension system for a heavy-duty vehicle of claim 5, the bellows chamber volume being between about 305 $in^3$ and about 915 $in^3$.

7. The axle/suspension system for a heavy-duty vehicle of claim 5, the damping air spring further comprising a piston, the at least one additional chamber being disposed within the piston.

8. The axle/suspension system for a heavy-duty vehicle of claim 5, the second volume being between about 150 $in^3$ and about 550 $in^3$.

9. The axle/suspension system for a heavy-duty vehicle of claim 5, the at least one opening having a total cross-sectional area between about 0.039 $in^2$ and about 0.13 $in^2$.

10. The axle/suspension system for a heavy-duty vehicle of claim 5 wherein the total cross-sectional area, the second volume, and the bellows chamber volume are in a range of ratios between about 1:600:1200 and about 1:14100:23500, the range of ratios being an inclusive range of ratios alternatively expressible as 1:600-14100:1200-23500.

11. A method for optimizing damping of an axle/suspension system of a heavy-duty vehicle comprising the steps of:
   calculating a first curve representing a first damping energy relating to a load on an air spring with damping characteristics;
   calculating a second curve representing a second damping energy relating to an air flow velocity through at least one opening of the air spring;
   calculating an optimized motion ratio by determining an intersection of the first curve and the second curve;
   altering a geometry of said axle/suspension system to provide said axle/suspension system with the optimized motion ratio.

12. The method for optimizing damping of an axle/suspension system of claim 11, the optimized motion ratio being a ratio of a vertical distance traveled by the air spring divided by a vertical distance traveled by an axle of said axle/suspension system.

13. The method for optimizing damping of an axle/suspension system of claim 12, the vertical distance traveled by the air spring being between 130 mm to 320 mm.

14. The method for optimizing damping of an axle/suspension system of claim 12, the vertical distance traveled by the axle being between 90 mm and 190 mm.

15. The method for optimizing damping of an axle/suspension system of claim 12, said altering a geometry of the axle/suspension system further comprising changing a position of at least one of the air spring, the axle, and a beam of said axle/suspension system.

16. The method for optimizing damping of an axle/suspension system of claim 11, wherein the air spring further comprises
   a bellows chamber having a first volume;
   at least one additional chamber having a second volume; and
   wherein the at least one opening is in fluid communication with the bellows chamber and the at least one additional chamber.

17. The method for optimizing damping of an axle/suspension system of claim 16, the bellows chamber volume being between about 305 $in^3$ and about 915 $in^3$.

18. The method for optimizing damping of an axle/suspension system of claim 16, the second volume being between about 150 $in^3$ and about 550 $in^3$.

19. The method for optimizing damping of an axle/suspension system of claim 16, the at least one opening having a total cross-sectional area between about 0.039 in$^2$ and about 0.13 in$^2$.

20. The method for optimizing damping of an axle/suspension system of claim 16, wherein the air spring further comprises a piston, the at least one additional chamber being disposed within the piston.

\* \* \* \* \*